United States Patent [19]

Orthman

[11] 3,756,327
[45] Sept. 4, 1973

[54] TOOL BAR CLAMP
[75] Inventor: Henry K. Orthman, Lexington, Nebr.
[73] Assignee: Orthman Manufacturing Inc., Lexington, Nebr.
[22] Filed: Jan. 24, 1972
[21] Appl. No.: 220,333

[52] U.S. Cl................. 172/697, 172/763, 306/1.5, 287/54 A
[51] Int. Cl........................................... A01b 15/00
[58] Field of Search.................... 172/694, 697, 698, 172/744, 773, 774, 775, 776, 763; 306/1.5; 287/54 A, 54 B

[56] References Cited
UNITED STATES PATENTS
| 3,642,333 | 2/1972 | Eisenhardt et al.............. | 172/763 X |
| 917,762 | 4/1909 | Hench................................. | 306/1.5 |
| 2,937,705 | 5/1960 | Kirchner et al.................. | 172/776 X |
| 2,873,149 | 2/1959 | Redetzke........................ | 172/763 X |
| 3,157,415 | 11/1964 | Martin............................. | 172/744 X |

Primary Examiner—Robert E. Pulfrey
Assistant Examiner—R. T. Rader
Attorney—Zarley, McKee & Thomte

[57] ABSTRACT

An implement tool bar has working tools connected to it and the tool bar is connected to the implement frame by a tool bar clamp including a pair of saddle members embracing the tool bar with a pair of spaced apart clamping plates rigidly connected at adjacent inner ends to one of the saddle members while a pair of bolts extend from the other saddle member on opposite sides of the tool bar to between the pair of clamping plates for rigid engagement therewith. A vertically disposed tool shank is clamped between the outer ends of the clamping plates which diverge outwardly from a spacing substantially equal to the thickness of the shank. Upon the outer ends of the clamping plates being drawn together uniform pressure is applied along the opposite sides of the shank to rigidly hold it in place.

5 Claims, 5 Drawing Figures

PATENTED SEP 4 1973  3,756,327
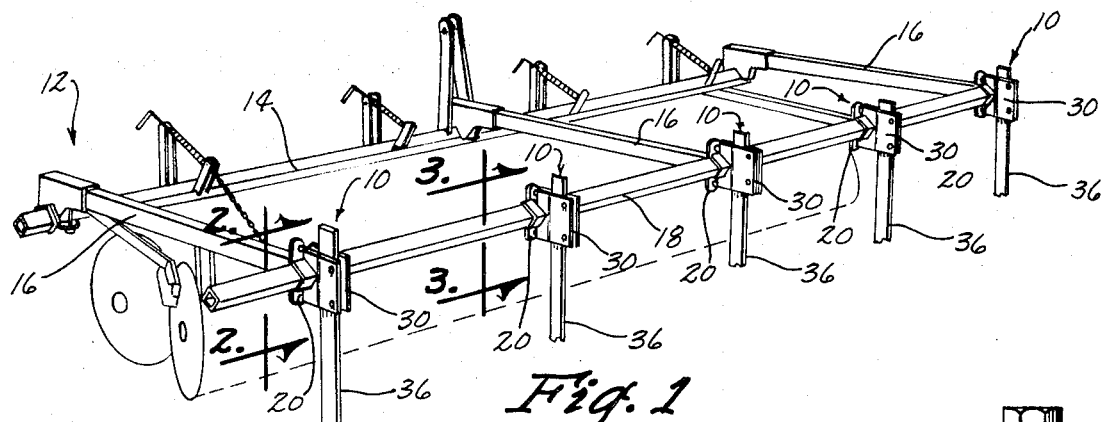
Fig. 1
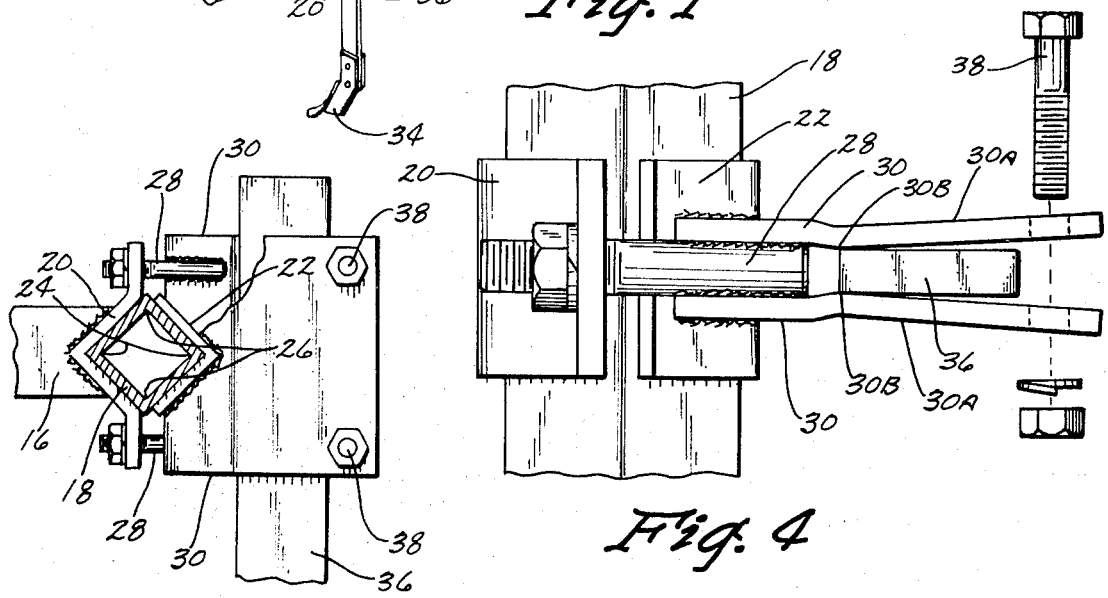
Fig. 2
Fig. 4
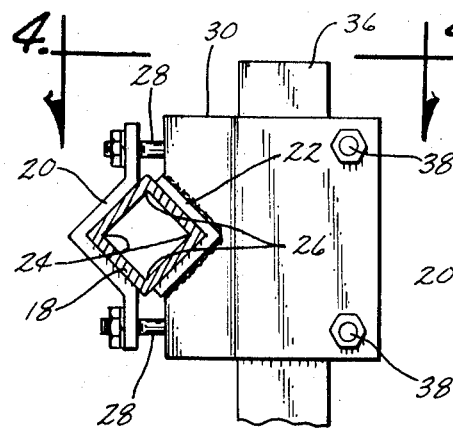
Fig. 3
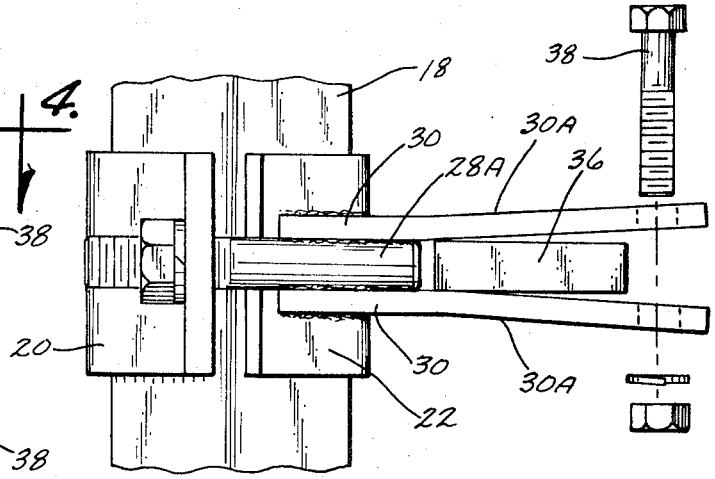
Fig. 5

TOOL BAR CLAMP

Many ground-working farm implements include tool bars which carry ground-working tools. Many implements are overly complicated and are limited in the ways in which they may be used. Separate mounting brackets may be used for mounting the tool bar to the implement frame and mounting tools on the tool bar. The tool spacing along the tool bar is critical and maximum adjustability therealong is required.

The tool bar clamp of this invention is easily attached to the implement and the same clamp is used for attaching the working tools to the tool bar. The tool bar clamp is universal and may be used for clamping the working tools to the tool bar only or in combination with attaching the tool bar to the implement frame. Only two bolts are required for securing the tool bar to the implement frame at each point of attachment and similarly only two bolts are required for clamping each tool to the tool bar. The design of the clamp gives maximum clamping strength with a minimum number of component parts.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a fragmentary perpsective view of a farm implement utilizing the tool bar clamp of this invention;

FIG. 2 is a cross sectional view taken along line 2 — 2 in FIG. 1 illustrating the tool bar clamp connecting the tool bar to the implement frame and a working tool shank to the tool bar;

FIG. 3 is a cross sectional view taken along line 3 — 3 in FIG. 1;

FIG. 4 is a cross sectional view taken along line 4 — 4 in FIG. 3; and

FIG. 5 is a top plan view similar to FIG. 4 but showing an alternate embodiment thereof.

The tool bar clamp of this invention is referred to generally in FIG. 1 by the reference numeral 10 and is shown on a lister cultivator 12 adapted to be mounted on the rear of a tractor.

The cultivator frame includes a front tool bar 14 having rearwardly extending spaced apart beams 16 connected through the tool bar clamp to a rear tool bar 18.

The tool bar clamp 10 includes a pair of saddle members 20 and 22 embracing the square in cross section tool bar 18. It is seen that the tool bar 18 is oriented such that oppositely disposed vertexes 24 and 26 are in horizontal and vertical planes respectively thereby maximizing the strength of the tool bar in relation to the forces applied to it. The saddle members 20 and 22 are accordingly V-shaped to matingly engage the exterior of the tool bar. The saddle member 20 includes a pair of bolts 28 which extend rearwardly for rigid engagement between a pair of clamping plates 30 above and below the tool bar 18. It is seen that the clamping plates 30 are, in addition to being welded to the bolts 28, welded to the saddle member 22. A V-shaped notch is formed in the plates 30 to matingly receive the saddle member 22. The clamping plates 30 provide additional structural strength to the saddle-type clamp. The rearwardly extending implement frame beam 16 is welded to the forward side of the forward clamp member 20, as seen in FIG. 2.

A ground engaging shovel 34 is provided on the lower end of a shank 36 which has its upper end extending between outwardly flared clamping portions 30A prior to a pair of bolts 38 being tightened down to draw the clamping plate portions 30A together, as seen in FIG. 1. It is seen that the thickness of the shank 36 in FIG. 4 is substantially the same as the distance between points 30B at the forward end of the clamping portions 30A and thus when the clamping portions are drawn together uniform pressure is applied to the exterior surfaces of the shank 36 to maximize the clamping action thereupon.

The bolts 28 are a sixteenth of a inch in diameter larger than the thickness of the plate 36 and thus the clamping plates 30 are deformed inwardly at 40 to reduce the space therebetween.

In the alternate embodiment of FIG. 5, the bolts 28A are the same diameter as the thickness of the plate 36 and thus the clamping plates 30 do not have the deformed inwardly portions 40 but rather extend to the end of the bolts 30 and then diverge outwardly with portions 30A. Upon removal of the bolts 38 the clamping portions 30A spring outwardly to the position of FIG. 4 thereby allowing the shank 36 to be easily removed and another shank may be inserted in its place.

It is seen that the orientation of the component parts of the tool bar clamp lend themselves to the strongest possible clamp. The tool bar being oriented with the apexes 24 and 26 horizontally and vertically disposed resist the horizontal forces applied by the shovels 34 on the shanks 36 as the implement moves horizontally forward. The clamping plates 30 are securely and rigidly connected to the tool bar through the saddle member 22 due to the angular disposition of the tool bar, as seen in FIG. 2. This mounting arrangement further resists rotational forces and bolts 28 connected to the forward saddle member 20 also strengthen the connection of the clamping plates 30 to the saddle member 22.

I claim

1. A tool bar clamp comprising,
a pair of horizontally disposed L-shaped saddle members adapted to be disposed on opposite sides of a tool bar,
a pair of vertically disposed spaced apart clamping plates having L-shaped notches formed in vertical edges of one end thereof and one of said L-shaped saddle members extending between said clamping plates and being matingly received in said L-shaped notches,
weldment means rigidly connecting abutting edges of said pair of clamping plates to the exterior surface of said one L-shaped saddle member,
a pair of bolts vertically spaced apart having ends positioned between said pair of clamping plates and rigidly connected thereto by weldments and extending from said clamping plates on opposite sides of said one saddle member with free ends of said bolts adapted to extend through openings in said other saddle member, and
bolt means adapted to extend through the outer free ends of said clamping plates for drawing them tightly together against a vertically disposed tool shank adapted to be positioned between said outer free ends of said clamping plates.

2. The structure of claim 1 wherein said free ends of said clamping plates flare outwardly and are adapted to be drawn together by said bolt means against spring action in said clamping plates.

3. The structure of claim 2 wherein the inner ends of said flared outer ends of said clamping plates are spaced apart the approximate width of a tool shank such that substantially uniform clamping pressure along said shank will be applied upon said bolt means drawing said clamping plates together.

4. The structure of claim 3 wherein the diameter of each of said bolts is equal to the spacing between the inner ends of the flared outer ends of said clamping plates.

5. The structure of claim 3 wherein the diameter of each of said bolts is larger than the spacing between the inner ends of the flared outer ends of said clamping plates and said clamping plates include inwardly converging portions between said bolts and the inner ends of said outer free ends of said clamping plates.

* * * * *